United States Patent [19]
Hanabusa

[11] Patent Number: 4,853,125
[45] Date of Patent: Aug. 1, 1989

[54] FLUID CHAMBER HAVING A TUBULAR FILTER AND A SECURING RECESS FOR MOUNTING THE SAME

[75] Inventor: Hisao Hanabusa, Aichi, Japan

[73] Assignee: Toyoda Gosei Co., Ltd., Nishikasugai, Japan

[21] Appl. No.: 60,616

[22] Filed: Jun. 11, 1987

[30] Foreign Application Priority Data

Jun. 30, 1986 [JP] Japan ............................ 61-100732[U]

[51] Int. Cl.⁴ ....................... B01D 29/00; B01D 35/02
[52] U.S. Cl. .................................... 210/172; 210/452; 210/455; 55/505
[58] Field of Search ............... 210/172, 167, 168, 448, 210/452, 455, 477; 55/498, 505, 506, 510; 60/453, 454

[56] References Cited

U.S. PATENT DOCUMENTS

| 573,172 | 12/1896 | Young | 210/172 |
|---|---|---|---|
| 1,203,290 | 10/1916 | Weiland | 210/168 |
| 1,274,940 | 8/1918 | Sage | 210/452 |
| 1,604,048 | 10/1926 | Hobbs | 210/172 |
| 2,011,031 | 8/1935 | Birch | 210/452 |
| 2,372,286 | 3/1945 | Mieras | 210/168 |
| 2,394,154 | 2/1946 | Curtis et al. | 210/172 |
| 2,409,928 | 10/1946 | Cahenzli, Jr. | 210/172 |
| 3,217,887 | 11/1965 | Meister | 210/172 |
| 3,991,568 | 11/1976 | Latimer et al. | 60/453 |
| 4,035,300 | 7/1977 | Stapleton et al. | 210/172 |
| 4,077,884 | 3/1978 | Naumann | 210/455 |
| 4,212,739 | 7/1980 | Hilton et al. | 210/172 |
| 4,454,031 | 6/1984 | Schier | 210/172 |
| 4,654,141 | 3/1987 | Frentzell | 210/452 |

Primary Examiner—Richard V. Fisher
Assistant Examiner—Linda S. Evans
Attorney, Agent, or Firm—Cushman, Darby & Cushman

[57] ABSTRACT

A fluid chamber having main body provided with a fluid inlet port, a fluid outlet port and a tubular filter element interposed between the fluid inlet port and the fluid outlet port. A securing recess is defined about the periphery of the fluid inlet port interiorly of the main body of the fluid chamber. The securing recess is sized so as to securely receive the tubular filter element. the securing recess limits the outward deformation of the filter under the influence of the high pressure fluid flow through the inlet port while ensuring that the inwardly flowing fluid can be sufficiently filtered.

15 Claims, 4 Drawing Sheets

FLUID CHAMBER HAVING A TUBULAR FILTER AND A SECURING RECESS FOR MOUNTING THE SAME

BACKGROUND OF THE INVENTION

1. Field of the Invention

The present invention relates to fluid chambers which are capable of filtering a fluid which flows into the chambers and then allowing the outward flow thereof and which are suitable for use as, for example, oil chambers for the power steering systems of automobiles.

2. Description of the Prior Art

A conventional fluid chamber of this sort exemplified by an oil chamber for power steering systems of automobiles is shown in FIG. 7. The main body 2 of such an oil chamber 1 comprises an upper wall 2a and a lower wall 2b both being made of synthetic resin such as polyamide or the like and are secured together by welding. An inlet port 3 for screw fixing a cap 4 is formed in the upper portion of the upper wall 2a of the chamber. The lower portion of the lower wall 2b of the chamber has a return-side nipple 5 which acts as an inlet port for oil and a supply-side nipple 6 that serves as an outlet port for oil L.

In order to filter and supply inwardly flowing oil L, a shoulder 7 and a boss 2c are provided on the internal surface of the lower wall 2b of the chamber in such a manner that the boss 2c secures a filter 8 in position at its center by means of a screw 10 and the shoulder 7 supports the periphery of the filter 8. This filter 8, as shown in FIG. 8, comprises a frame body 8a over which a fine meshed strainer net 9 is fitted and secured.

In the oil chamber 1, therefore, oil L which flows into the chamber through the nipple 5 on the return-side is filtered by the filter 8 and then flows out through the nipple 6 on the supply-side.

In the conventional oil chamber 1, however, the filter 8 is secured in a rather poor manner in that the center of the filter is secured to the boss 2c of the lower wall 2b of the chamber by means of the screw 10 and the periphery of the filter is brought into contact with the upper surface of the shoulder 7 of the lower wall 2b of the chamber. So it is difficult for the conventional oil chamber 1 with the filter 8 to sufficiently filter the oil L which flows under a pressure of 6 kg/cm² or thereabout during the operation of the power steering system because the periphery of the filter 8 sometimes separates from the shoulder 7 due to the pressure of the oil L as shown by the two-dot chain line in FIG. 7 and oil L flows through the gap between the shoulder 7 and the periphery of the filter 8.

SUMMARY OF THE INVENTION

Accordingly, it is an object of the present invention to provide a fluid chamber in which deformation of the filter therein is prevented during usage and which is capable of ensuring sufficient filtration of the fluid.

A fluid chamber according to this invention has an inlet port and an outlet port with a filter provided between the inlet port and the outlet port thereof, and is characterized by the provision of a securing recess around the periphery of the inlet port on the inner surface of the main body of the chamber for fitting and securing a tubular filter.

According to present invention, the fluid chamber has a tubular filter which is secured to the securing recess around the periphery of the inlet port on the inner surface of the main body of the chamber for the purpose of limiting outward deformation of the filter due to the high pressure of the inward flow of a fluid through the inlet port.

In the fluid chamber according to the present invention, deformation of the filter thereof is limited and separation of the peripheral portion thereof from the inner surface of the main body of the chamber is prevented. Therefore, the inwardly flowing fluid can be filtered sufficiently before it is allowed to flow out.

DESCRIPTION OF THE PREFERRED EMBODIMENTS

Figure 1:
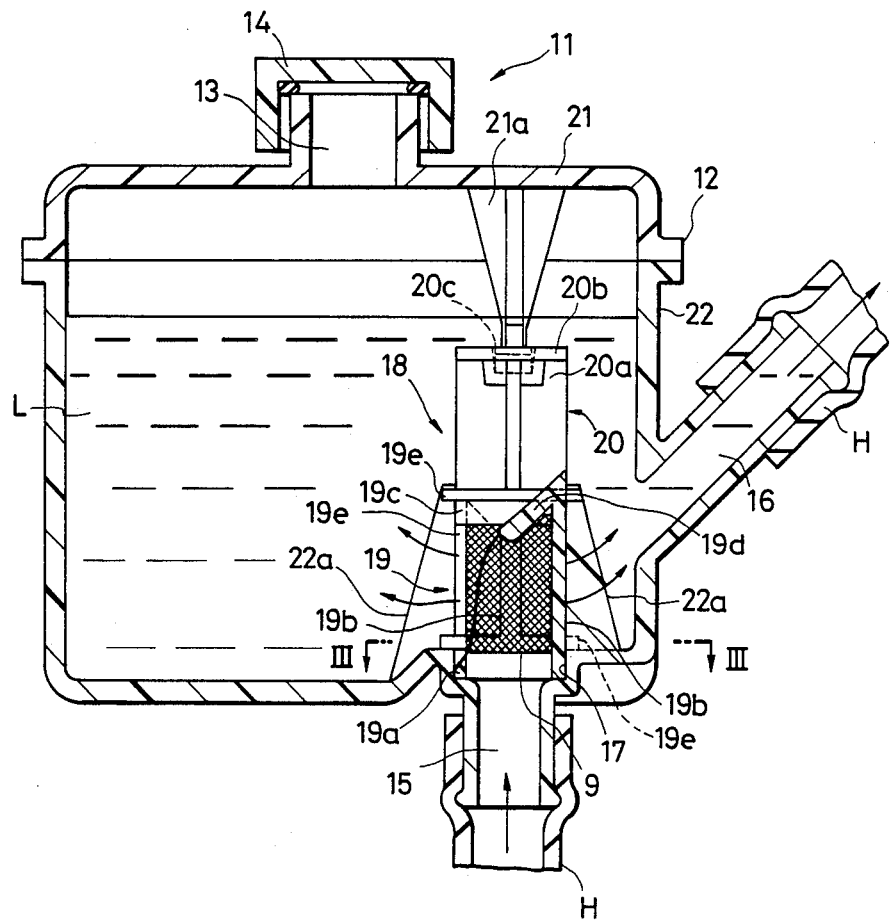
FIG. 1 is a cross sectional view of an oil chamber in accordance with one embodiment of this invention.

Referring to the drawings, embodiments of this invention will now be described.

FIG. 1 shows a chamber 11 in accordance with a first embodiment which is similar to a conventional oil chamber used for the power steering system for an automobile and having a main body 12 that comprises an upper wall 21 and a lower wall 22 of the chamber both being made of synthetic resin such as polyamide or the like and secured together by welding in the form of a substantially rectangular parallelepiped body.

An inlet port 13 for oil L is provided at the center of the upper portion of the upper wall 21 of the chamber and a cap 14 is screwed to the inlet port 13. A retaining rod 21a projecting downwardly is provided at a predetermined position on the inner surface of the upper portion of the upper wall 21 of the chamber.

Figure 3:
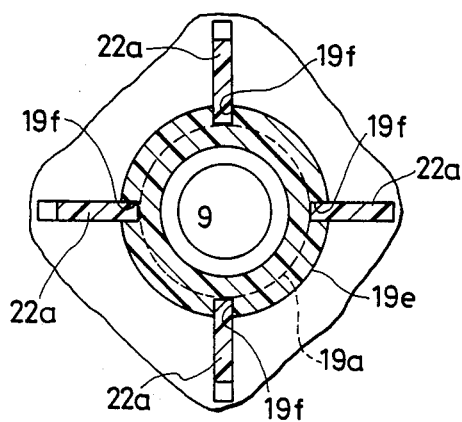
FIG. 3 is an enlarged sectional view taken along line III—III of FIG. 1.

A supply nipple 16 which acts as an outlet port for oil L is provided on the side wall of the lower wall 22 of the chamber, and a return-side nipple 15 which acts as an inlet port for oil L is provided in the bottom surface of the lower wall 22 of the chamber. A securing recess 17, which is an annular groove, is provided around the periphery of the return nipple 15 on the inner surface of the lower wall 22 of the chamber. In order to prevent the filter 18 from swinging as described later, four radial ribs 22a for regulating the position of the filter are provided as shown in FIG. 3, each standing on the outside of the securing recess 17 on the inner surface of the lower wall 22 of the chamber.

The filter 18 to be secured to the securing recess 17 of the lower wall 22 of the chamber is made of synthetic resin such as polyamide or the like and has a cylindrical filtering portion 19 which has a closed top and an opened bottom. (Refer to FIGS. 1 and 2.)

The filtering portion 19 comprises a lower cylindrical portion 19a having an opened bottom, an upper cylindrical portion 19c having a closed top, a plurality of supporting rods 19b (the case of four rods is exemplified) which supports and communicates the upper cylindrical portion 19c with the lower cylindrical portion 19a, and a strainer net 9 made of polyamide or the like which is secured to the inner peripheries of the upper cylindrical portion 19a, the lower cylindrical portion 19c and the supporting rods 19b. The strainer net 9 is formed as an insert into a mold at the time of molding the filter 18. The contour of the lower cylindrical portion 19a just fits the securing recess 17 of the lower wall 22 of the chamber. Radial, discoid and projecting flanges 19e, 19e are provided at respective upper portions of the periphery of the lower cylindrical portion 19a and that of the upper cylindrical portion 19c. A notch 19f for fitting the position regulating rib 22a of the lower wall 22 of the chamber is formed at a predetermined position on each flange 19e. And in this embodiment, a substantially conical downwardly projecting portion 19d is provided on the bottom surface of the top of the upper cylindrical portion 19c.

A head portion 20 having a discoid ceiling 20b which is supported by a supporting column portion 20a arranged in the form of a cross is formed in the upper portion of the filtering portion 19 and is formed integrally with the filtering portion 19. The ceiling portion 20b of the head 20 has a recess 20c at the center of the upper surface thereof for fitting the lower end of the retaining rod 21a of the upper wall 21 of the chamber.

Assembling the oil chamber 11 will now be described below. When fitting the position regulating rib 22a to the notch 19f of the flange 19e, the lower cylindrical portion 19a of the filtering portion 19 of the filter 18 is fitted to the securing recess 17 of the lower wall 22 of the chamber. And then, while fitting the lower end of the retaining rod 21a to the recess 20c of the ceiling portion 20b of the head portion of the filter 18, the upper wall 21 of the chamber is fitted to the lower wall 22 of the chamber so as to weld them together. Thus, axial movement of the filter 18 is limited by the retaining rod 21a, while its movement in the radial direction is limited by the securing recess 17 and the position regulating rib 22a. Ultimately the oil chamber 11 is assembled with the filter 18 fixed in position.

According to this embodiment, when operating a power steering system (not shown) which causes a high pressurized inward flow of 6 kg/cm$^2$ or thereabout of oil L through the return side nipple 15 with a predetermined hose H fitted to the nipples 15, 16 respectively, with a predetermined quantity of oil L poured into the system, it is possible for this oil chamber 11 to sufficiently filter the inward flow of oil L and feed it out through the supply-side nipple 16 because the periphery of the filtering portion 19 does not separate from the inside. surface of the lower wall 22 of the chamber thanks to the limitation of any outward deformation of the filtering portion 19 of the filter 18. This limitation results from the fitting and securing of the lower cylindrical portion 19a of the filtering portion 19 of the filter 18 to the securing recess 17 of the lower wall 22 of the chamber.

Figure 7:
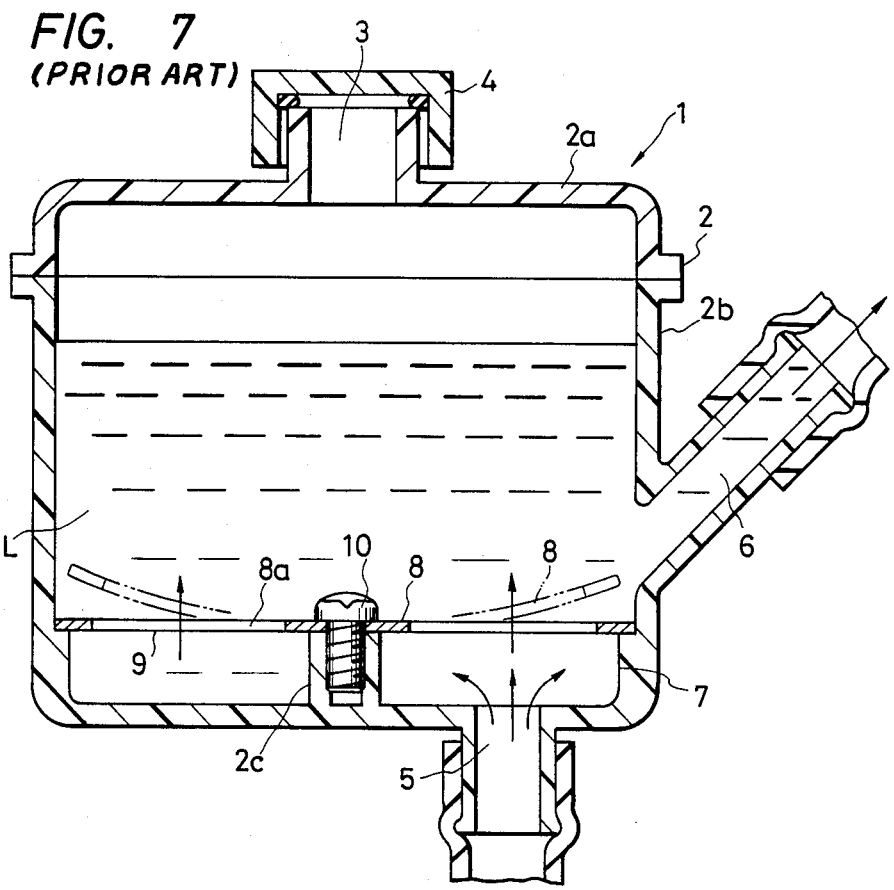
FIG. 7 is a cross sectional view of a conventional oil chamber.
Figure 8:
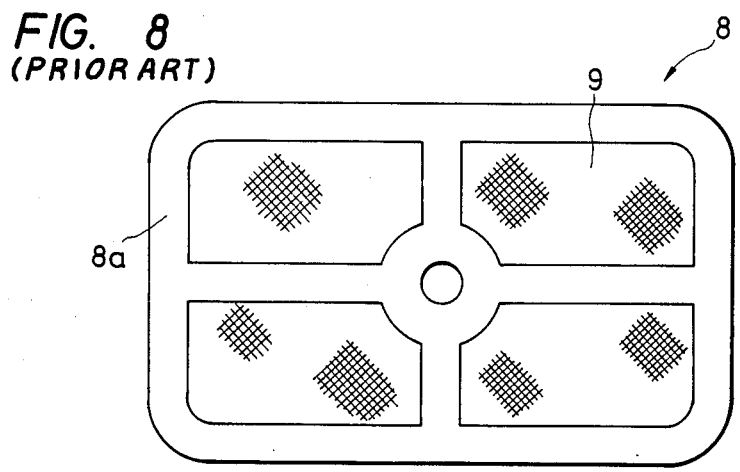
FIG. 8 is a plan view of a conventional filter.

Furthermore, the top end of the cylindrical filtering portion 19 of this oil chamber 11 is closed so as to prevent the inner surface of the upper portion of the upper wall 21 of the chamber having an inlet port 13 from receiving any direct impact from the inward flow of oil L through the return-side nipple 15. As a result, leakage of oil L through the inlet port 13 is prevented. In the conventional oil chamber 1 shown in FIG. 7, oil L may leak through the inlet port 3 because oil L directly collides with the inner surface of the upper portion of the upper wall 2a of the chamber in which the inlet port 3 is provided.

Furthermore, the oil chamber 11 has a substantially conical projecting portion 19d that is formed at the top end of the filtering portion 19 of the cylindrical portion so as to protect the filter 18 against the inward flow of oil L through the return-side nipple 15 by absorbing the pressure of that flow. Reduction of the welding strength between the upper wall 21 of the chamber and the lower wall 22 of the chamber which secures the filter 18 by means of the retaining rod 21a is thus prevented.

Although the position regulating rib 22a is provided on the lower wall 22 of the chamber for preventing the filter 18 from swinging, it may be omitted in the case where swinging of the filter 18 is prevented by deep engagement of the lower cylindrical portion 19a of the filtering portion 19 of the filter 18 with the securing recess 17 of the lower wall 22 of the chamber.

Figure 2:
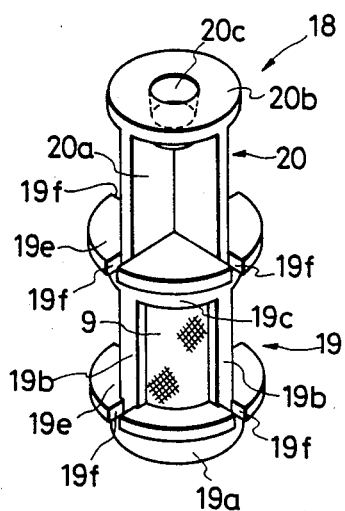
FIG. 2 is a perspective view of a filter in accordance with the embodiment.
Figure 4:
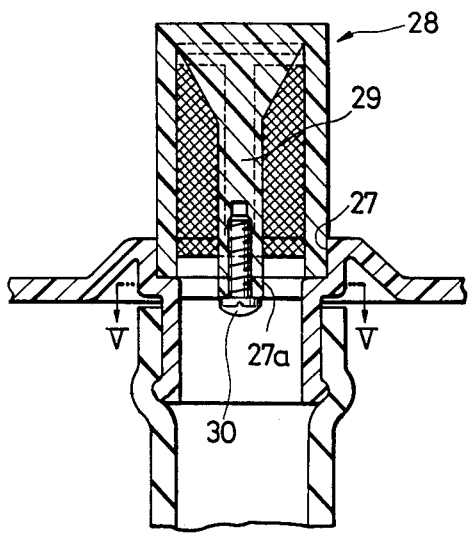
FIG. 4 is a cross sectional view of another embodiment.
Figure 5:
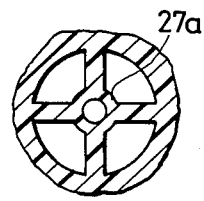
FIG. 5 is a cross sectional view taken along line V—V of FIG. 4.
Figure 6:
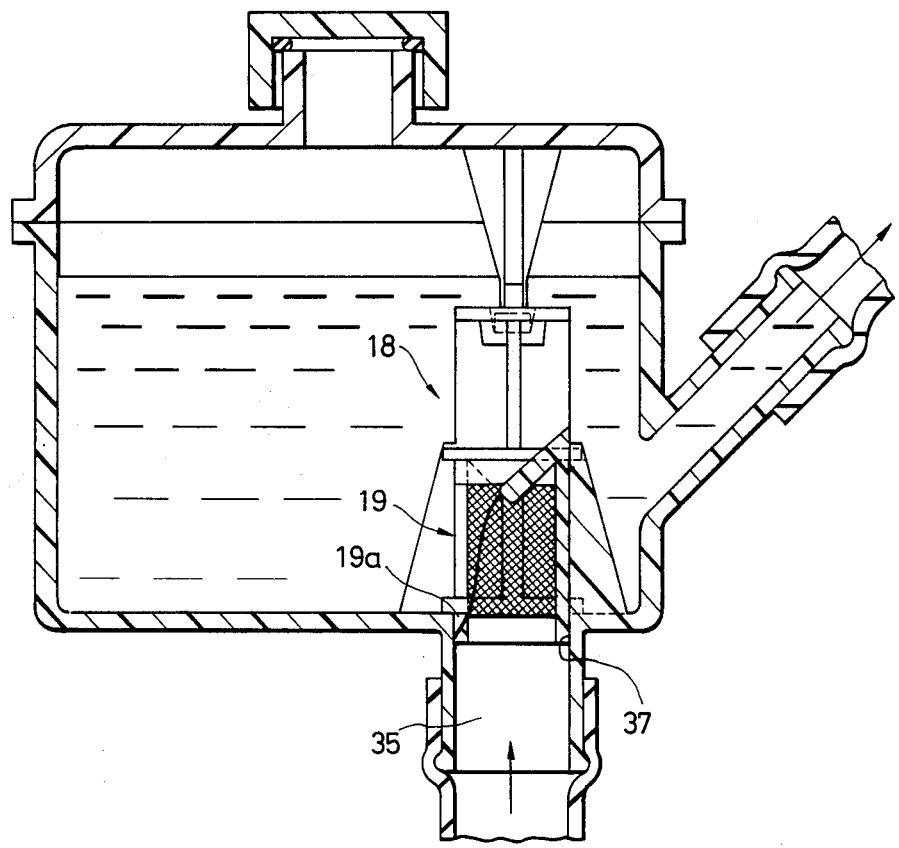
FIG. 6 is a cross sectional view showing still another embodiment.

According to this embodiment, the filter 18 is fitted without any screw means for the purpose of eliminating unnecessary working. However, the filter 28 may also be arranged by means of a screw 30 as shown in FIGS. 4, 5 that fixes the lower end opening side of the filter 28 to the securing recess 27 by provision of a bearing surface 27a the cross sectional shape of which is substantially a cross at the position which is on the periphery of the securing recess 27 on the inner surface of the chamber to allow for fitting of the fitting portion 29 which projects downwardly from the bottom surface of the top end of the filter 28. The filter 28 is formed in substantially the same shape as that of the filtering portion 19 of the filter 18 as shown in FIGS. 1, 2 except for omission of the flange 19e of the filtering portion 19 and provision of the fitting portion 29 which is a downward projection of the conical projection 19d of the filtering portion 19.

Although the annular grooved securing recess 17 of the return-side nipple 15 on the inner surface of the chamber is shown in the embodiment, a securing recess 37 in which the lower cylindrical portion 19a of the filtering portion 19 is fitted to the periphery of a return-side nipple 35 on the inner surface of the chamber may be alternatively provided.

What is claimed is:

1. A fluid filtering chamber comprising: a main body portion having a fluid inlet port and a fluid outlet port, said main body portion defining a fluid chamber;

means defining a securing recess about the periphery of said fluid inlet port on the interior surface of said main body portion;

a tubular filter element sized so as to be snuggly received at least partially within said securing recess means, said filter element including a lower cylindrical portion having an open bottom, an upper cylindrical portion having a closed top and a substantially conical downwardly projecting portion provided on the under-surface of the closed top, a plurality of supporting rod elements extending between and coupling said upper cylindrical portion and said lower cylindrical portion, and means for filtering fluid secured to the inner peripheries of said upper cylindrical portion, said lower cylindrical portion and said supporting rod elements; and a radial, discoid projecting flange mounted to an upper portion of the periphery of said lower cylindrical portion and a radial, discoid projecting flange mounted to the upper cylindrical portion, and at least one position regulating rib extending between the inner surface of said fluid chamber and each said flange, each said flange having at least one notch for receiving said at least one position regulating rib.

2. A fluid filtering chamber as in claim 1, further comprising a retaining rod coupled to an upper portion of said main body portion and wherein said filter element has a fitting means at the center of the upper surface thereof for fitting a lower end of the retaining rod.

3. A fluid filtering chamber as in claim 2, further comprising a head portion mounted to said tubular filter element vertically above said upper cylindrical portion, said head portion having a discoid ceiling portion and a supporting column for supporting said discoid ceiling portion, said discoid ceiling portion having said fitting means at the center of the upper surface thereof.

4. A fluid filtering chamber as in claim 2, wherein said main body portion comprises an upper wall having said retaining rod and a lower wall having said securing recess means.

5. A fluid filtering chamber as in claim 4, wherein said upper wall and said lower wall are formed from the same synthetic resin and secured together by welding.

6. A fluid filtering chamber as in claim 1, further comprising a retaining rod coupled to an upper wall of said fluid chamber and a head portion mounted to said tubular filter element vertically above said upper cylindrical portion, said head portion having a discoid ceiling portion and a supporting column for supporting said discoid ceiling portion, said supporting column being cross-shaped in cross-section, said discoid ceiling portion of said head portion having a recess at the center of the upper surface thereof for receiving a lower end of the retaining rod.

7. A fluid filtering chamber as in claim 1, further comprising a retaining rod coupled to an upper portion of said main body portion and wherein said filter element has a fitting means at the center of the upper surface thereof for fitting a lower end of the retaining rod.

8. A fluid filtering chamber as in claim 7, further comprising a substantially conical downwardly projecting portion provided on the under-surface of the top of said upper cylindrical portion.

9. A fluid filtering chamber as in claim 1, wherein said filter element has a fitting means at the center of the upper surface thereof for fitting a lower end of a retaining rod coupled to an upper portion of said main body portion and said main body portion comprises an upper wall having said retaining rod and a lower wall having said securing recess means.

10. A fluid filtering chamber as in claim 9, further comprising a substantially conical downwardly projecting portion provided on the under-surface of the top of said upper cylindrical portion.

11. A fluid filter chamber as in claim 9, wherein said upper wall and said lower wall are formed from the same synthetic resin and secured together by welding.

12. A fluid filtering chamber as in claim 1, further comprising a retaining rod coupled to an upper portion of said main body portion and wherein said filter element has a fitting means at the center of the upper surface thereof for fitting a lower end of the retaining rod and even further comprising a head portion mounted to said tubular filter element vertically above said upper cylindrical portion, said head portion having a discoid ceiling portion and a supporting column for supporting said discoid ceiling portion, said discoid ceiling portion having said fitting means at the center of the upper surface thereof.

13. A fluid filtering chamber as in claim 12, further comprising a substantially conical downwardly projecting portion provided on the under-surface of the top of said upper cylindrical portion.

14. A fluid filtering chamber as in claim 1, further comprising a retaining rod coupled to an upper wall of said fluid chamber and a head portion mounted to said tubular filter element vertically above said upper cylindrical portion, said head portion having a discoid ceiling portion and a supporting column for supporting said discoid ceiling portion, said supporting column being cross-shaped in cross-section, said discoid ceiling portion of said head portion having a recess at the center of the upper surface thereof for receiving a lower end of the retaining rod.

15. A fluid filtering chamber as in claim 14, further comprising a substantially conical downwardly projecting portion provided on the under-surface of the top of said upper cylindrical portion.

* * * * *